United States Patent
Thota et al.

(10) Patent No.: US 8,352,183 B2
(45) Date of Patent: Jan. 8, 2013

(54) MAPS FOR SOCIAL NETWORKING AND GEO BLOGS

(75) Inventors: Chandrasekhar Thota, Redmond, WA (US); Gur Kimchi, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 195 days.

(21) Appl. No.: 11/401,209

(22) Filed: Apr. 10, 2006

(65) Prior Publication Data

US 2007/0203644 A1    Aug. 30, 2007

Related U.S. Application Data

(60) Provisional application No. 60/764,815, filed on Feb. 4, 2006.

(51) Int. Cl.
- *G06F 7/00* (2006.01)
- *G06F 17/10* (2006.01)
- *G05D 3/00* (2006.01)
- *G08G 1/123* (2006.01)

(52) U.S. Cl. ... 701/454; 701/461; 701/300; 340/995.14; 340/995.27; 707/724; 707/732

(58) Field of Classification Search .................. 701/200, 701/207, 208, 209, 211, 212, 213, 300, 400, 701/409, 450, 454, 461, 516; 340/989–990, 340/995.1, 995.13, 995.14, 995.15, 995.18, 340/995.24, 995.23, 995.27; 707/705, 724, 707/726, 732–734

See application file for complete search history.

(56) References Cited

U.S. PATENT DOCUMENTS

| | | | |
|---|---|---|---|
| 5,966,135 A * | 10/1999 | Roy et al. | 345/619 |
| 6,138,072 A * | 10/2000 | Nagai | 701/207 |
| 6,148,260 A * | 11/2000 | Musk et al. | 701/200 |
| 6,819,267 B1 * | 11/2004 | Edmark et al. | 340/988 |
| 7,373,606 B2 * | 5/2008 | Gorzela | 715/738 |
| 2003/0055983 A1 * | 3/2003 | Callegari | 709/227 |
| 2005/0032528 A1 * | 2/2005 | Dowling et al. | 455/456.1 |
| 2005/0038717 A1 * | 2/2005 | McQueen et al. | 705/27 |
| 2006/0047825 A1 * | 3/2006 | Steenstra et al. | 709/229 |
| 2006/0085750 A1 * | 4/2006 | Easton et al. | 715/708 |
| 2006/0229058 A1 * | 10/2006 | Rosenberg | 455/404.2 |
| 2006/0270419 A1 * | 11/2006 | Crowley et al. | 455/456.2 |
| 2007/0038614 A1 * | 2/2007 | Guha | 707/4 |

* cited by examiner

*Primary Examiner* — Thomas Tarcza
*Assistant Examiner* — Edward Pipala
(74) *Attorney, Agent, or Firm* — Shook, Hardy & Bacon L.L.P.

(57) ABSTRACT

A unique system, method, and user interface are provided that involve an integration of map technology with social networks so that individuals can select members of these communities with which to communicate based at least in part on their location, thus enhancing the communication experience. This can be referred to as geo-based messaging. In particular, a member or user of the system and/or method can include his/her personal location information, for example, when joining an online community or social network. This location information can be employed to generate one or more maps that plot the locations of messages posted by community members. As a result, a user can readily visualize any other users or community members located at any selected distance from him/her or from any selected focal point.

16 Claims, 15 Drawing Sheets

Jet Fuel Only

Judith　　　　　　　　　　　　　　　　　　　　　　　　　Blog | Feed | Bloggers Nearby

Bremerton, WA, United States | 47.6332816489945, -122.637562849575

Mindless Bit Spew rjones@airgap.net (Ry Jones)　　　　　　　　　　　　　Blog | Feed | Bloggers Nearby When you run out of hammers...

Lynnwood, WA, United States | 47.8000831305602, -122.254421961678 tparks's WebLog tparks　　　　　　　　　　　　　　　　　　　　　　　　Blog | Feed | Bloggers Nearby

, WA, United States | 47.788794811112, -122.20687844127 smart brother smart brother　　　　　　　　　　　　　　　　　　　　Blog | Feed | Bloggers Nearby For the man accustomed to paying $100 or more for his suits Renton, WA, United States | 47.45, -122.12

Jesus, Family & Scrapbooking

Joy　　　　　　　　　　　　　　　　　　　　　　　　　Blog | Feed | Bloggers Nearby

Renton, WA, United States | 47.45, -122.12 the angry bulldog

Blog | Feed | Bloggers Nearby

Like a Ted Williams shot around the famed Penski Pole at Fenway, providing you a crusading argument against the tyranny of the majority.

Redmond, WA, United States | 47.6631773869917, -122.035112844023

FIG. 10

BlogMap Service APIs

Here you can find the ("RESTful") BlogMap APIs and corresponding documentation. If you have any issues or questions, use the BlogMap Discussion list.

Service end-point:

http://www.feedmap.net/blogmap/services/rest.ashx method: blogmap.getblogmap

Input parameters:

- feed - feed url that is registered with BlogMap.
- width - width of the map image.
- height - height of the map image.

Sample:
http://www.feedmap.net/blogmap/services/rest.ashx?method=blogmap.getblogmap&feed=http://www.csthota.com/blog/rss.aspx Notes

- When successful (stat=200), this method always returns a map url and blog details.
- Blog "coords" attribute represents the pixel coordinates on the map image.
- When not successful (stat=500), this method returns an error node.

FIG. 13

MAPS FOR SOCIAL NETWORKING AND GEO BLOGS

CROSS REFERENCE TO RELATED APPLICATION

This application claims the benefit of U.S. Provisional Application Ser. No. 60/764,815, entitled MAPS FOR SOCIAL NETWORKING AND GEO BLOGS and filed on Feb. 4, 2006, the entirety of which is incorporated herein by reference.

BACKGROUND

In the current market of high-tech personal and commercial products, advances in mobile technology, processor speeds, memory capabilities, and sleek compact device designs have both private individuals and members of the corporate world indelibly attached to their computers, PDAs, smart phones, cell phones, and laptops as a means to communicate with their friends and family near and far away. Computer-driven social networks continue to increase in size as people are introduced to one another or brought together via the Internet. Current computing systems support some aspects of online interactions between users—mainly allowing users to communicate with each other via messaging or blogging. However, there remains much room to improve these conventional systems to provide more effective and more efficient communication between such users.

SUMMARY

The following presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

The subject application relates to a system(s) and/or methodology that provide an integration of map technology with social networks. This allows individuals to select members of these communities with which to communicate based at least in part on their location, thus enhancing the communication experience. In particular, a member or user of a social network community can provide his/her personal location information. This location information can be employed to generate one or more maps showing the location of community members (e.g., with respect to other members). As a result, a user can readily visualize any other users or community members located at any distance from him/her or in any desired location. In addition to simply viewing users' locations, this geo-based approach to communication can facilitate meetings among users with similar interests or opinions and transactions can be more readily performed there-between.

Blogging is one type of communication that can be enhanced with this geo-based approach. Imagine that a user can select an area or geographic region using a "blog map" and obtain information about any bloggers located in that region as well as view their postings. Communicating in this manner for event planning, dating, asking questions, or commenting can be improved through the use of such maps. In any of these scenarios, members can be searched and/or selected for communication according to their location.

Furthermore, neighboring members with respect to any community member can be readily identified and visualized on the map. For instance, James can employ a navigational control to view his neighbors. The list of neighbors can be organized with those closest to him appearing at the top of the list and those furthest away toward the bottom of the list. Hence, James is the current focal point. An entire social network community can be considered or parameters can be set to define the preferred distance limits. The focal point can be easily changed by selecting to view the neighbors of any other person listed as a neighbor of James.

Other geo-based navigational controls can be employed as well such as browse, search, and explore which facilitate communication between community members based at least in part on their locations. Members of the community can be readily identified by the presence of a stamp sized map that illustrates their current locations or at least their last identified location.

To the accomplishment of the foregoing and related ends, certain illustrative aspects of the invention are described herein in connection with the following description and the annexed drawings. These aspects are indicative, however, of but a few of the various ways in which the principles of the invention may be employed and the subject invention is intended to include all such aspects and their equivalents. Other advantages and novel features of the invention may become apparent from the following detailed description of the invention when considered in conjunction with the drawings.

BRIEF DESCRIPTION OF THE DRAWINGS

FIG. 10 is an exemplary user interface that continues from FIG. 9—demonstrating at least a portion of the content on page 33 of the search results.

FIG. 13 is an exemplary user interface that provides API information in order to render a map view of the member's location for the benefit of other members.

DETAILED DESCRIPTION

Figure 1:
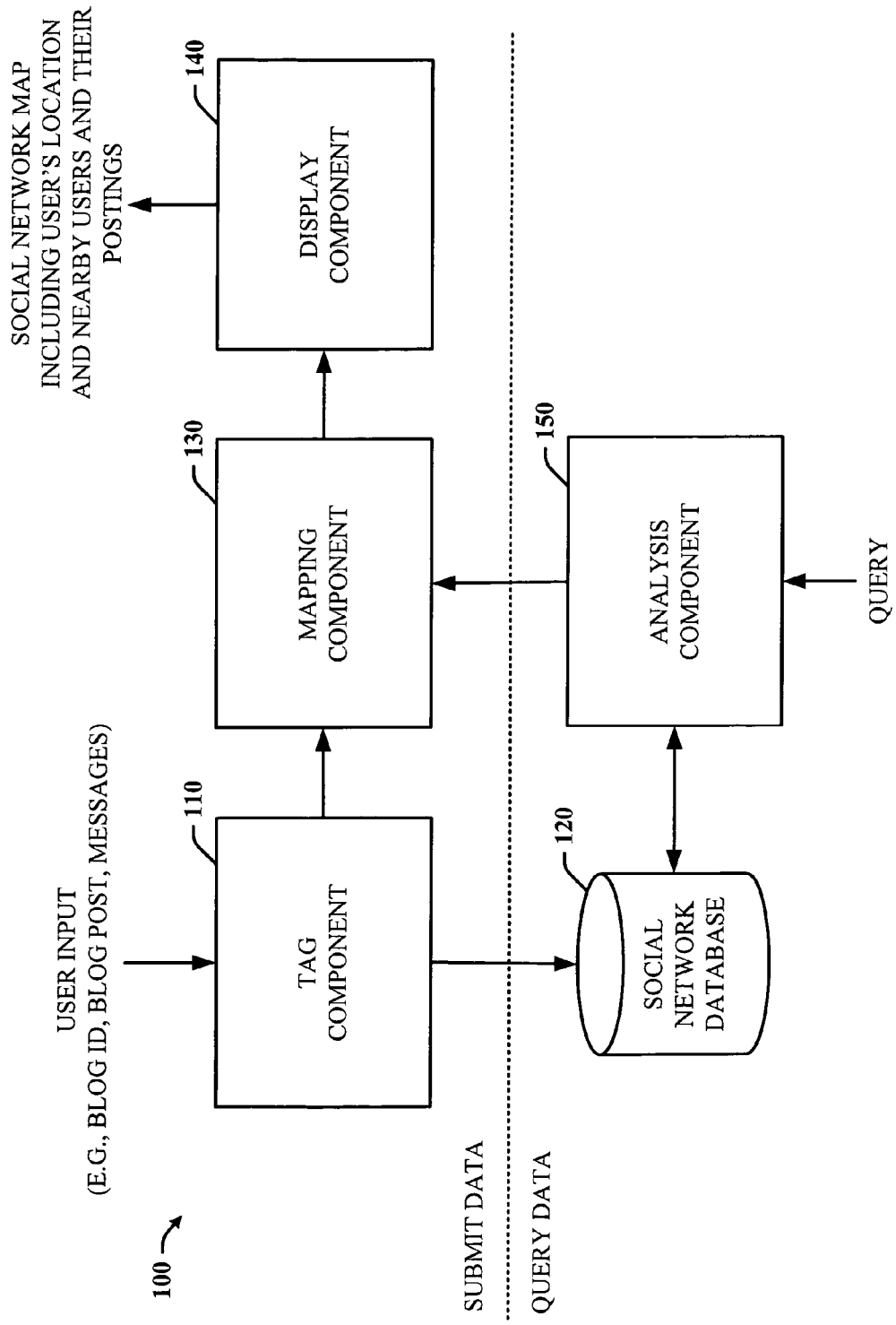
FIG. 1 is a block diagram of a mapping system that facilitates generating one or more maps based in part on geo-based input and/or a geo-based query in a social network/communication environment.

The subject systems and/or methods are now described with reference to the drawings, wherein like reference numerals are used to refer to like elements throughout. In the following description, for purposes of explanation, numerous specific details are set forth in order to provide a thorough understanding of the systems and/or methods. It may be evident, however, that the subject systems and/or methods may be practiced without these specific details. In other instances, well-known structures and devices are shown in block diagram form in order to facilitate describing them.

As used herein, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers.

Blogging has become a rather popular activity among Internet users in recent years. In fact, many social network communities provide blogging arenas where users can post their comments, thoughts, or feedback on virtually any topic. Unlike typical blogging systems which are often limited to only receiving and posting blogs, the subject application provides systems and methods that allow bloggers to locate one another and to communicate with other bloggers based on their locations. Communicating in this manner enhances the blogging experience in general and improves communication within the social network community.

Referring now to FIG. 1, there is a general block diagram 100 of a mapping system 100 that facilitates generating one or more maps based in part on geo-based input and/or a geo-based query in a social network/communication environment. The system includes a tag component 110 that can tag incoming data or input from a user with geo-code data such as coordinates relating to the user's location. It should be appreciated that any coordinate system can be employed. The user's location can be his/her current location as it corresponds to the user's most recent message posting. That is, the tag component 110 can determine the user's location based on his/her message posting (or blog). For example, the user may be living or traveling in London, England. Thus, when the user posts a message to the community, the tag component 110 can tag the message with a London location.

Alternatively, the user can preset the tag component 110 to associate a particular location with any postings submitted by the user regardless of the user's current (actual) location. For instance, the user may have preset his location to Dallas, Tex. When vacationing in Denver, any postings submitted by the user can be associated with Dallas rather than Denver. In either case, the tagged data can be stored for later retrieval as needed in one or more databases 120.

The tag component 110 can provide the geo-code information and related message(s) to a mapping component 130. To view a subject user's location as well as the locations of other users in the social network community, the mapping component 130 can generate at least one map view based on a selected focal point. The focal point can be the subject user's location or some other selected location. The map view can be displayed on-screen by a display component 140 and provide a clear visualization of the focal point location and any existing blogs (or members) within a set distance from the focal point. The distance can be determined on an individual basis or by a default setting.

The map view can function in at least two different ways. First, it can identify a particular user as a member of the relevant social community (e.g., FIG. 4, infra); and second, it can show the locations of other member users (e.g., their blog locations) in a selected area or within a given distance of that area (e.g., FIG. 5, infra). In particular, community members can query the social network database 120 to find, browse, or explore other selected geographic areas to see the members located there, the subject matter and even the content of their postings. Thus, data can be retrieved from the database 120 in terms of postings or by community member. Query results can be rendered in one or more map views by the mapping component 130 and then displayed accordingly. Using various navigational controls, the user may switch between views as desired and navigate within each view to see different levels of detail.

In practice, for example, imagine the following scenario: a major hurricane has just swept through large portions of the Gulf States, devastating metropolitan areas beyond recognition. One area of interest may be Miami, Fla. due to its high-priced water-front real estate and recent status as a celebrity hot-spot. Robert, a member of a particular nation-wide blogging community, lives in California and has been watching the news coverage but assumes that mainstream news is somewhat filtered compared to reactions or opinions from local residents in that area. Robert does not personally know any members living in Miami or in surrounding cities so he cannot contact anyone directly. However, using the system 100, Robert can submit a query for blog postings located in Miami and then view any existing postings to obtain photos, commentary, etc. from people living in that area. If one blog is of particular interest, neighboring blogs (e.g., 20 mile default radius) can be queried and/or viewed as well to get a more thorough understanding-of what people in this particular area are experiencing. Blogs 50 miles away from Miami can be searched or browsed as well to gain additional insight. For instance, Robert may be interested to know if the storm reached these areas as well, to hear reactions from residents living outside of the metropolitan area, and to see how long these residents wait for government assistance. Thus, viewing a selected blog and being able to then view neighboring blogs can greatly enhance information gathering and improve the speed with which it is done.

Figure 2:
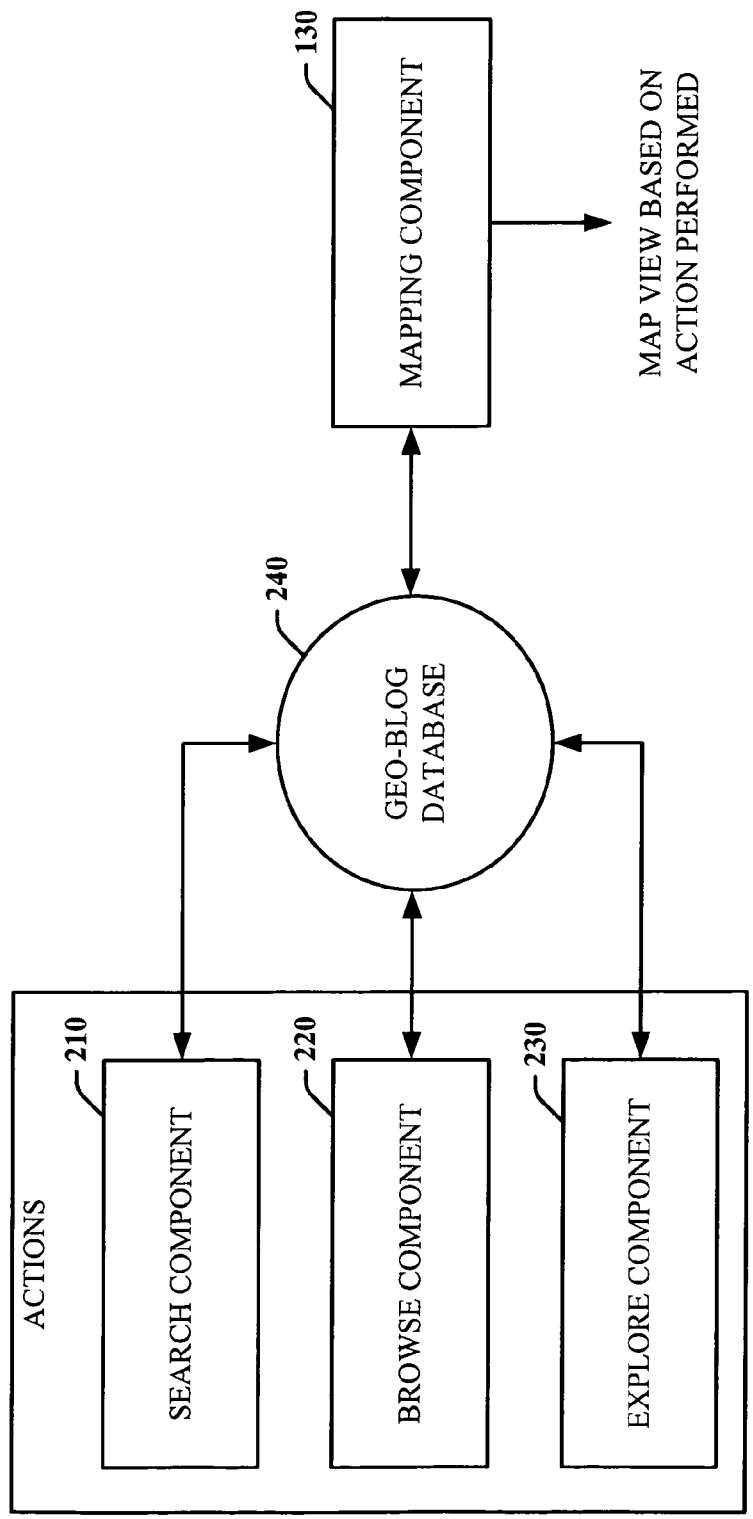
FIG. 2 is a block diagram of a mapping system that facilitates generating one or more maps according to a geo-based query in a social network/communication environment.

Referring now to FIG. 2, there is a block diagram of a mapping system 200 that facilitates generating one or more maps according to a geo-based query in a social network/communication environment. The system 200 includes a plurality of action controls such as a search component 210, a browse component 220, and an explore component 230.

These components can each query a social network geo-blog database 240 for different types of information. For example, the search component 210 can search the database 240 by location to find blogs in a particular city. This can be helpful for users who are interested in obtaining information about a city or to determine what topics are at the forefront of the city's residents or visitors. Suppose Jane is planning to move her family to Denver, Colorado but knows very little about the city and its suburban areas. She can perform a search for blogs in Denver by way of the search component 210 to view blogs in Denver as well as neighboring suburban areas.

Alternatively, blogs can be browsed according to their subject matter and/or by their location. For example, key words abstracted from blog content can be presented to the user. If the user wants to view blogs about "Dogs", he can click on the word or phrase to view such blogs. He can also narrow the number of blogs by limiting the display to a particular location—such as Los Angeles, Calif. Similarly, the user can browse blogs by selecting a city, state, or country to view the blogs located therein.

Community membership can also be explored from a map view. The system can present a global map view and the user can zoom in, zoom out, or click on desired areas on the map to view any blog members found in that area. For example, imagine the user zooms in on Dallas, Texas. By right clicking on the city or in the vicinity of the city marker on the map, the number of blogs found in this area can be displayed to the user. From this vantage point, the user can continue to navigate around the map or otherwise interact with any displayed blog members.

Figure 3:
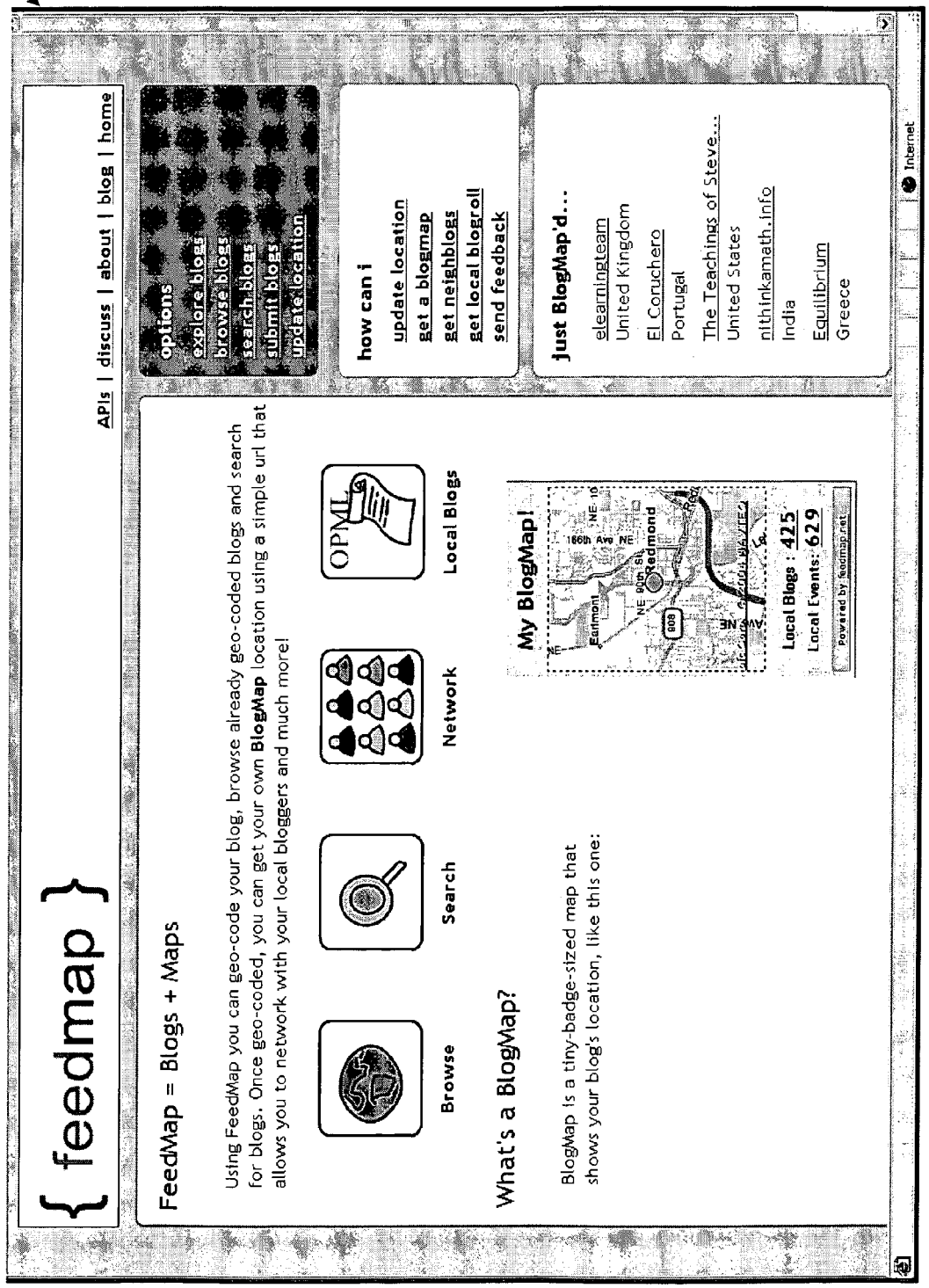
FIG. 3 is an exemplary user interface for a social network communication community wherein communication between or among members can be facilitated by providing maps that show member locations and their postings.

Turning now to FIG. 3, there is an exemplary user interface 300 for a social network community wherein communication between or among members can be facilitated by providing maps that show member locations and their postings. By allowing the members to view the community according to its members' geographic locations, communication within the community can be improved and the overall experience for the members can be enhanced. Current members can update their location or other personal information as well as interact with the community. For users interested in joining the community, the user interface 300 provides set-up options as well as a display of some members who have recently joined and their respective locations (e.g., "just BlogMap'd").

Figure 4:
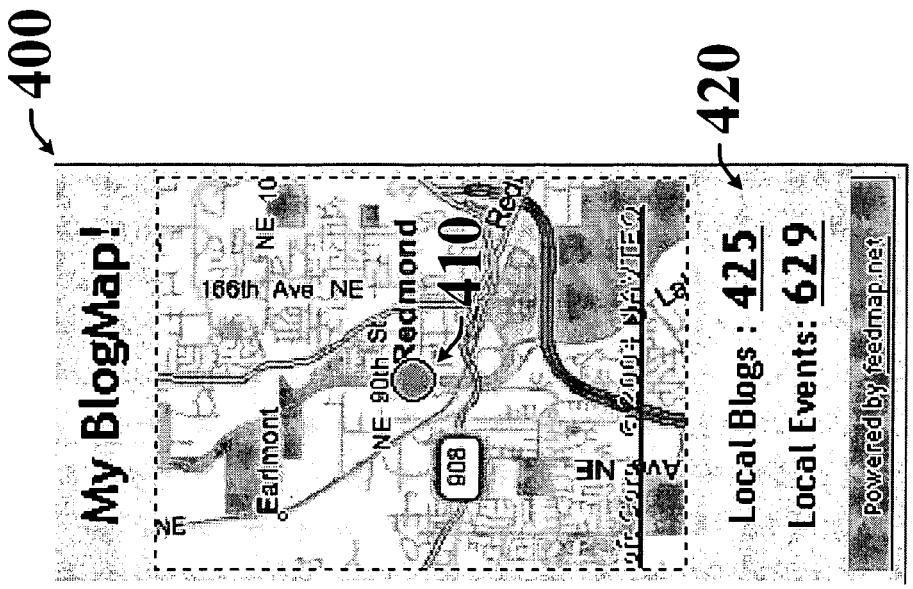
FIG. 4 is an exemplary user interface for an on-screen map of a community member's location which can also identify the particular user as a member of a specific community.

In FIG. 4, there is an exemplary user interface for an individualized on-screen map view 400 of a community member's location. The map view 400 can identify the particular user as a member of a specific community. In particular, the map view 400 can be rendered on any member's site or page as desired using one or more APIs (FIG. 13) and employed as a means of identifying himself as a member of a particular social network community (e.g., ABC Bloggers). In addition to providing the member's location 410 (Redmond, Wash.), the map view 400 can also include the number of "Local Blogs" (or members) 420 within a given distance from the focal point (e.g., subject member)—e.g., 425—as well as the number of "Local Events" based on the focal point—e.g., 629.

Figure 5:
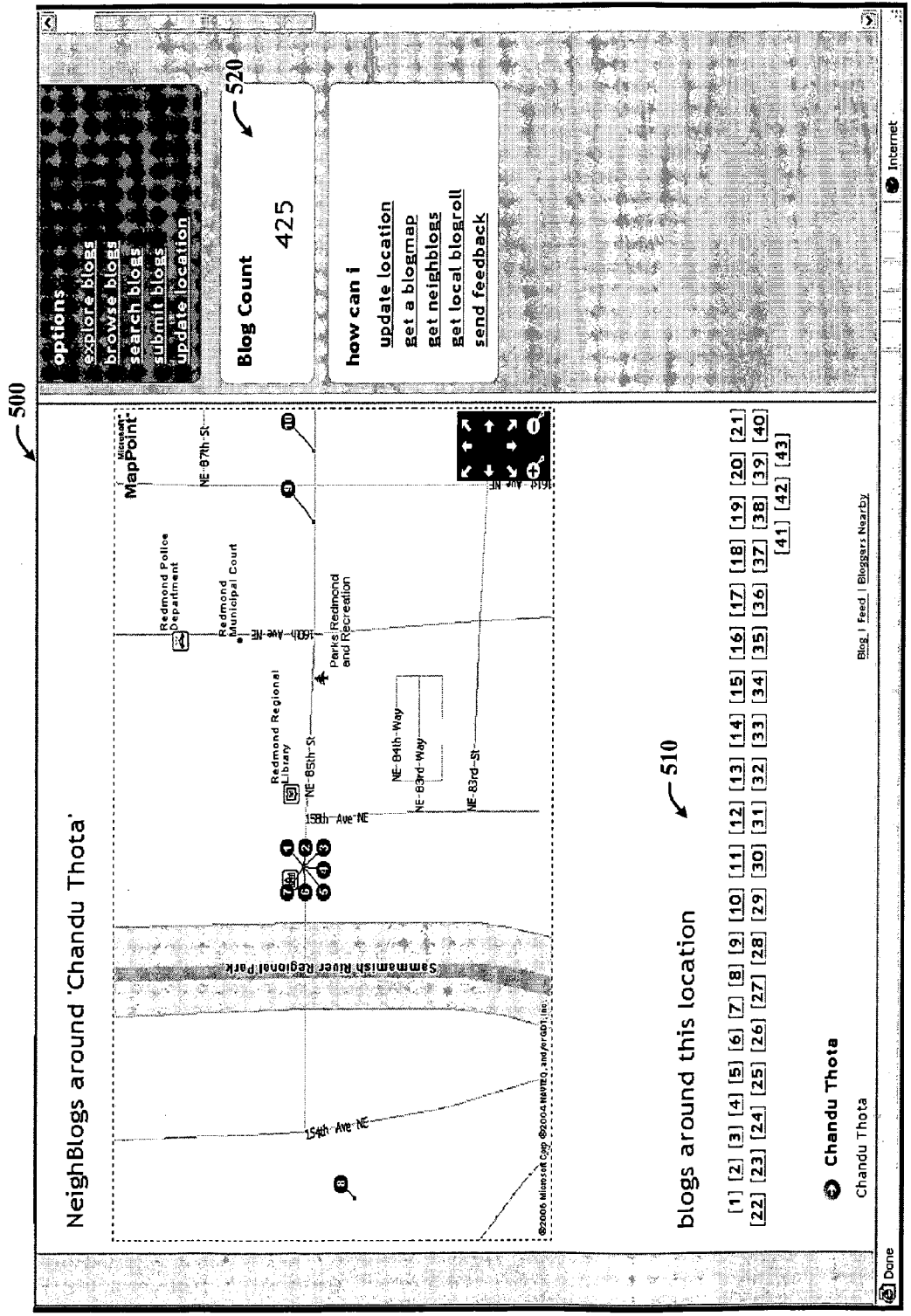
FIG. 5 is an exemplary user interface of a map view that shows a member's neighbors in the social network based on their real or physical locations.

To view the local blogs or local events, the respective item can be selected or clicked on in order to render the appropriate map view. For example, when clicking on local blogs, the map view 500 as shown in FIG. 5 can appear. This map view 500 illustrates Chandu Thota's (a member) local neighbors in the social network based on their geographic locations. More specifically, the map view 500 shows blogs numbered 1 through 10 that are within a z mile radius of and closest to Chandu, wherein z may be a default or custom setting chosen by the user.

Below the map view 500 is a list of pages 510 (e.g., page 1 through 43) wherein each page contains some number of blogs to total the 425 local blog count 520 that are located within the z mile radius of Chandu. The blogs are paginated according to their distance from the current user or the current queried location. For example, blogs on page 2 are located at a closer distance to the current user than those appearing on page 30.

Figure 6:
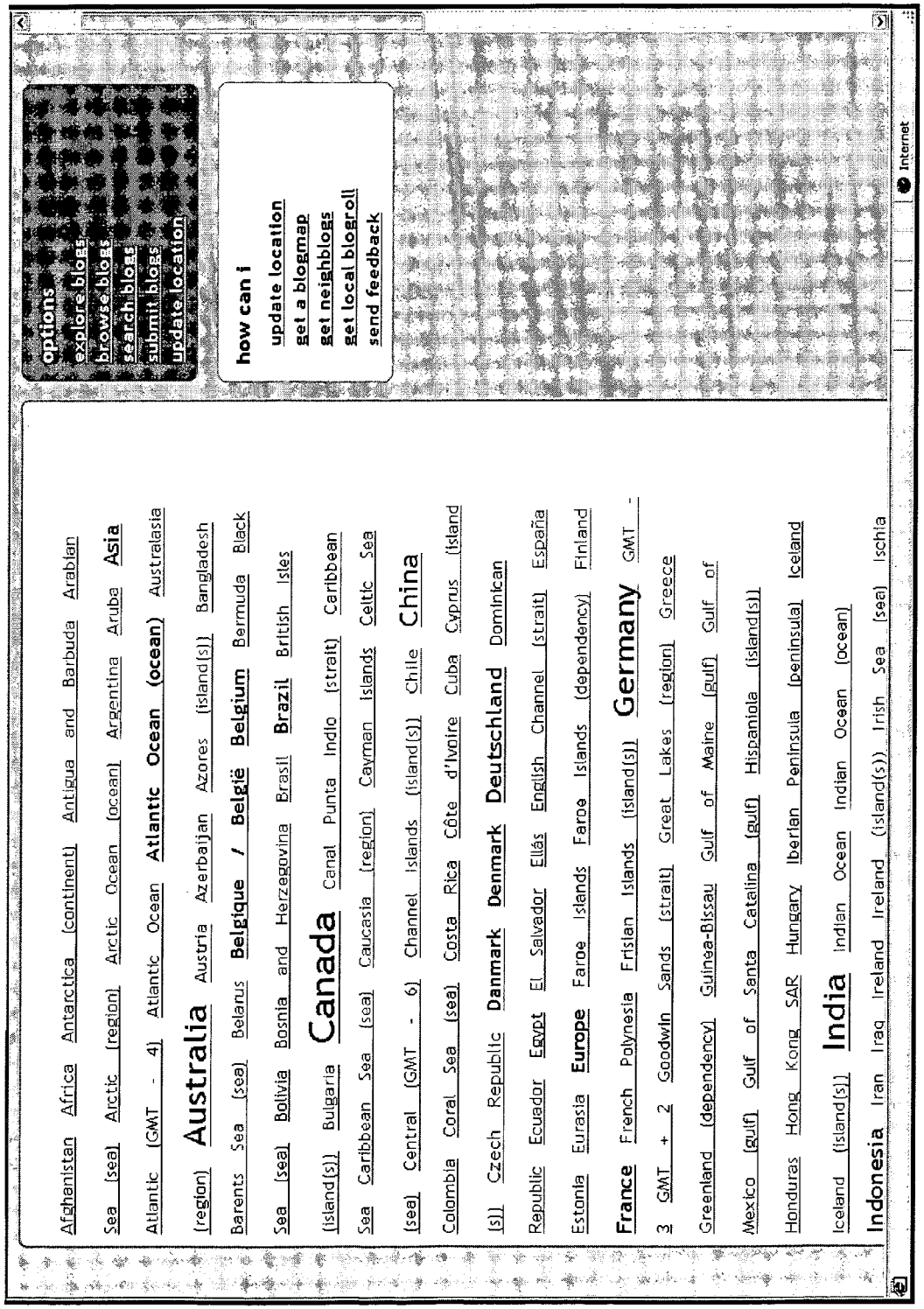
FIG. 6 is an exemplary user interface of a screen that facilitates a browse operation by which members of the community can browse through the community membership by geographic location.

Moving on to FIG. 6, there is an exemplary user interface of a screen that facilitates a browse operation by which members of the community can browse through the community membership by geographic location. More specifically, the presence of a location in this view indicates that at least one blog or member is located therein. The relative size or color shade of the location name can indicate a relative number of members located therein. For example, Canada and Australia appear much larger in size and boldness compared to Africa, Austria, and Bulgaria among others. Denmark and Deutschland are also larger than Africa, Austria, and Bulgaria but smaller than Canada and Australia, which indicates that it has fewer members than Canada and Australia but more than Africa, Austria, and Bulgaria.

Figure 7:
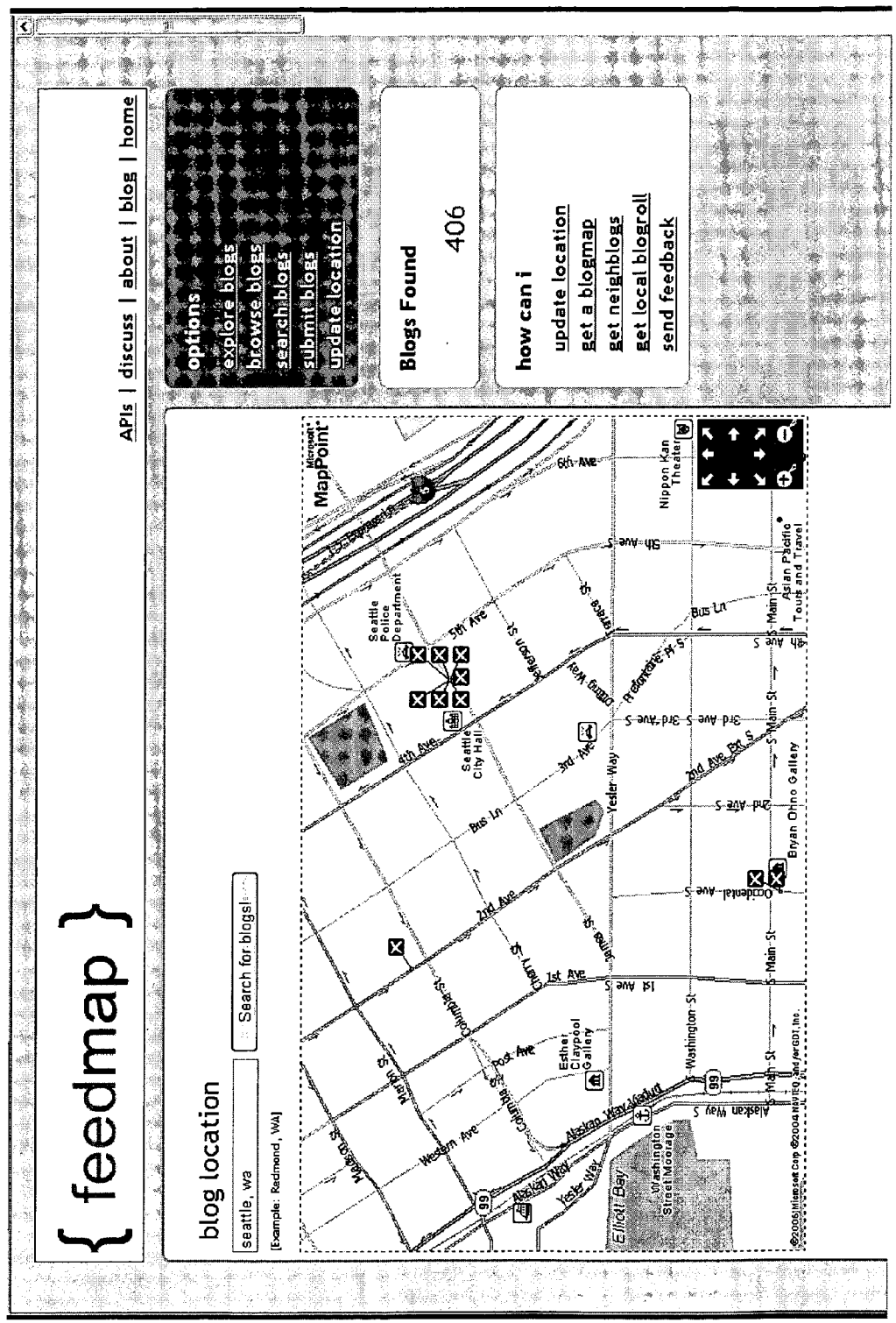
FIG. 7 is an exemplary user interface of a screen that facilitates searching for members or message posting according to their location and of a map that displays the results of such a search according to distance parameters.
Figure 8:
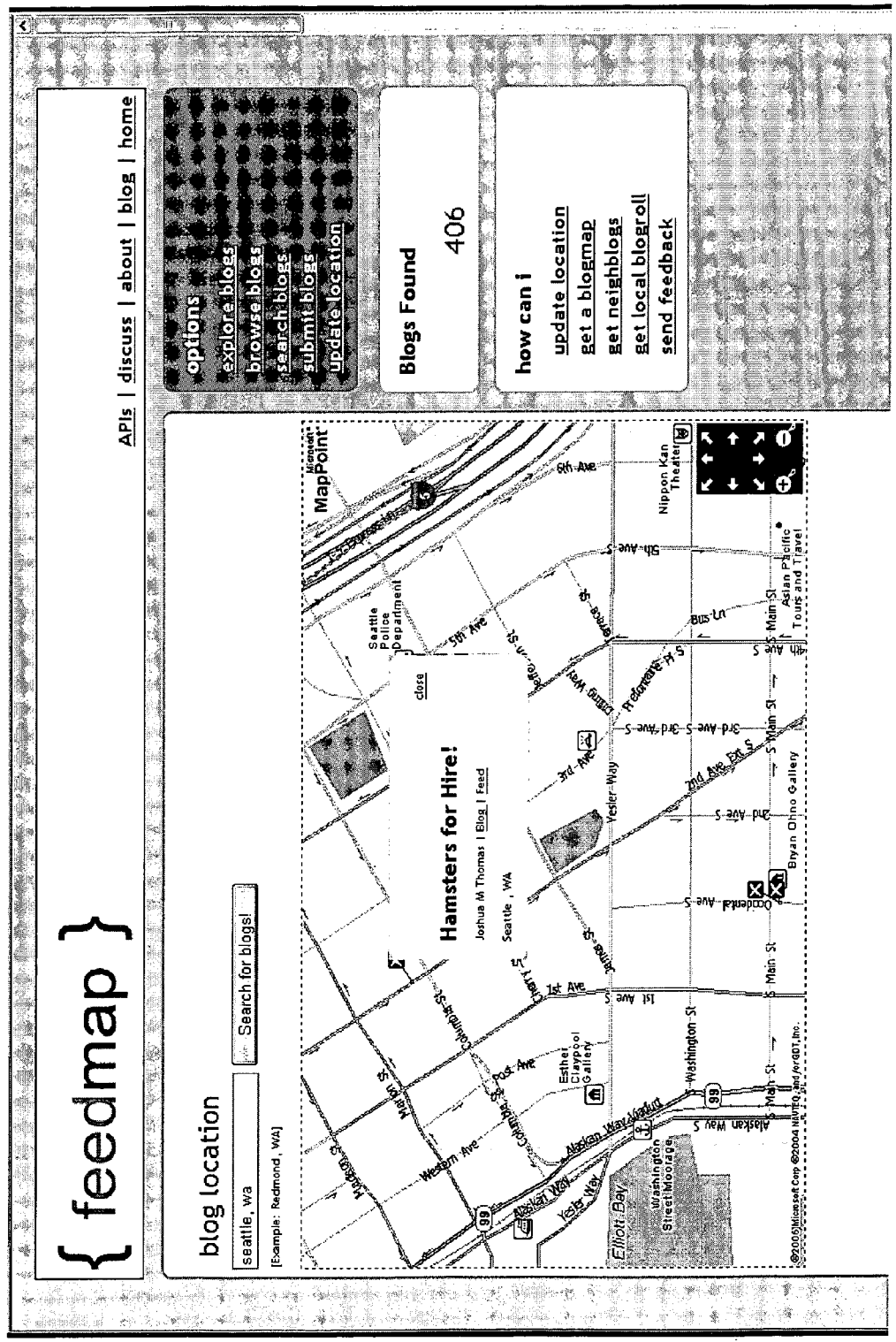
FIG. 8 is an exemplary user interface that demonstrates a hover operation performed on a map marker wherefrom the member's information can be viewed as well as their previous or most recent posting.

FIG. 7 illustrates an exemplary user interface of a screen that facilitates searching for members or message postings according to their location and presenting the results on a map. The map facilitates displaying the search results according to distance parameters. According to this screen, a search for "Seattle, Wash." blogs has been submitted and the map view displaying the search results is shown. In particular, the screen indicates that there are "406 Blogs Found" in the queried area. When hovering over a particular marker or flag on the map with a pointing device, the blog or member's information can be made visible as depicted in FIG. 8. The title of this member's most recent blog can also be visible. In some cases, a portion of the blog can also be included here.

Figure 9:
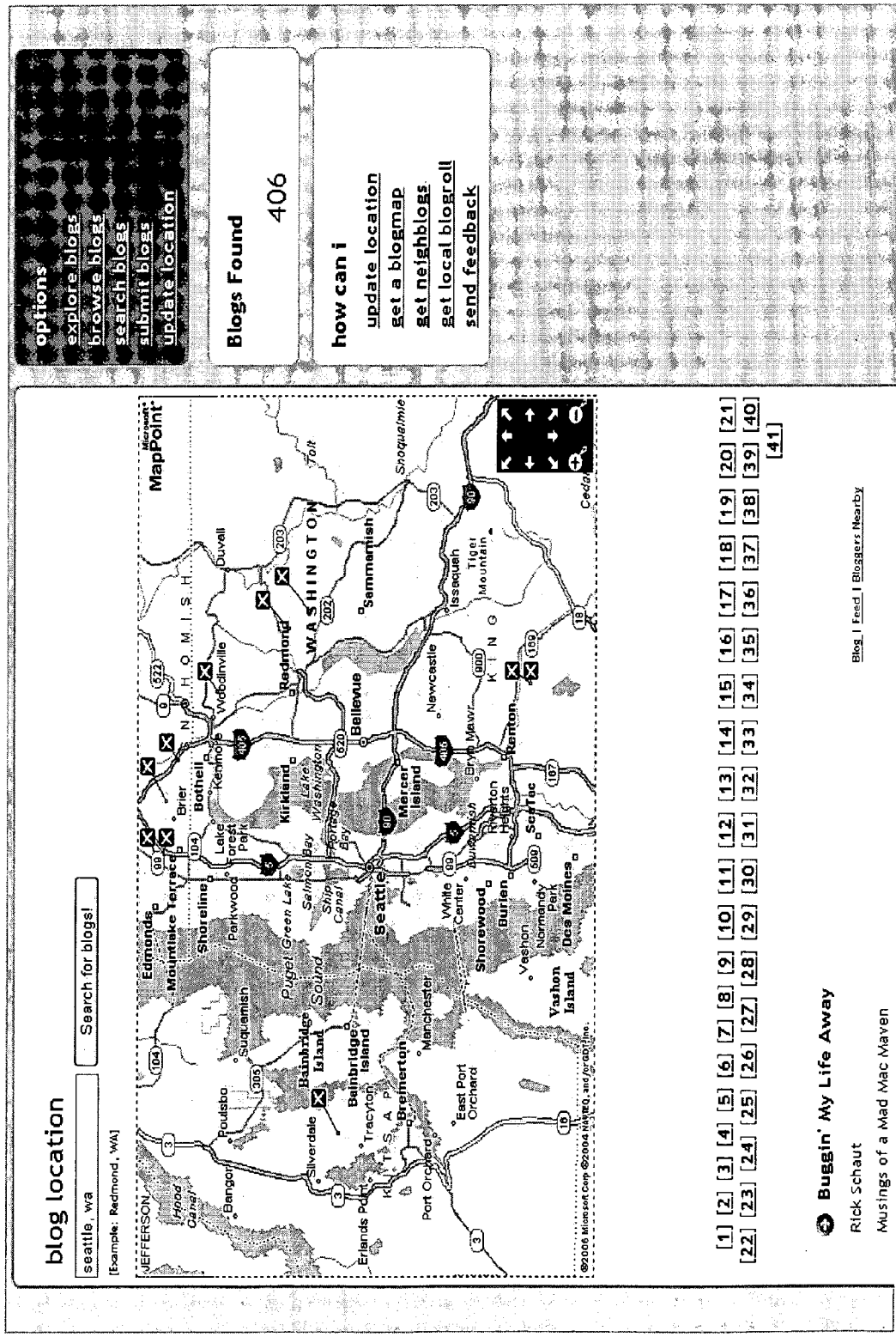
FIG. 9 is an exemplary user interface that demonstrates a map view continued from FIG. 7, wherein the user has jumped to page 33 of the search results and a map corresponding to the location of those results (on page 33) is provided.

For any given search, multiple pages of results may be returned. The map view in FIG. 7 shows the results included on page 1 (e.g., [1]—see FIG. 9 which continues from FIGS. 7 and 8). As the user clicks on any page to view the blogs listed thereon, the content of the map view changes accordingly in order to show the blog locations of bloggers or blogs on a selected page. FIG. 9 demonstrates a map view continued from FIG. 7 (and/or FIG. 8), wherein the user has jumped to page 33 of the search results and a map corresponding to the location of those results (on page 33) is provided. The results on page 33 are a further distance away from Seattle, Wash. than the results included on pages 1-32, and thus the map view appears to be zoomed out from the earlier view in FIG. 7.

Figure 11:
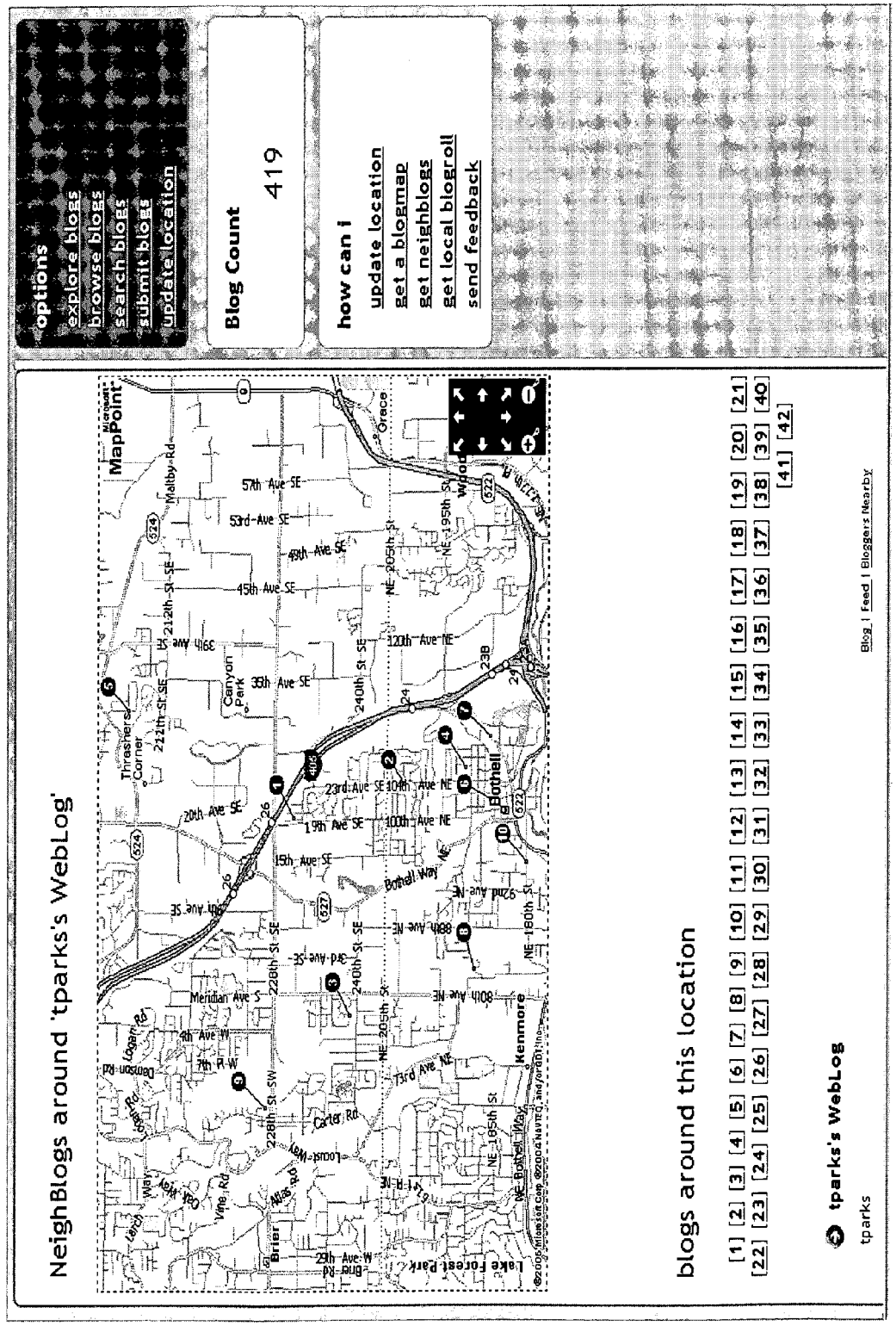
FIG. 11 is an exemplary user interface that demonstrates another user's neighbors as determined by geographic location.

FIGS. 10 and 11 further demonstrate navigating through the geo-coded community. In FIG. 10, there is an exemplary user interface that continues from FIG. 9—demonstrating at least a portion of the content on page 33 of the search results. To view any member's neighbors, the appropriate "bloggers nearby" control button can be selected or clicked on (e.g., tparks). FIG. 11 demonstrates tparks's neighbors as determined by geographic location.

Figure 12:
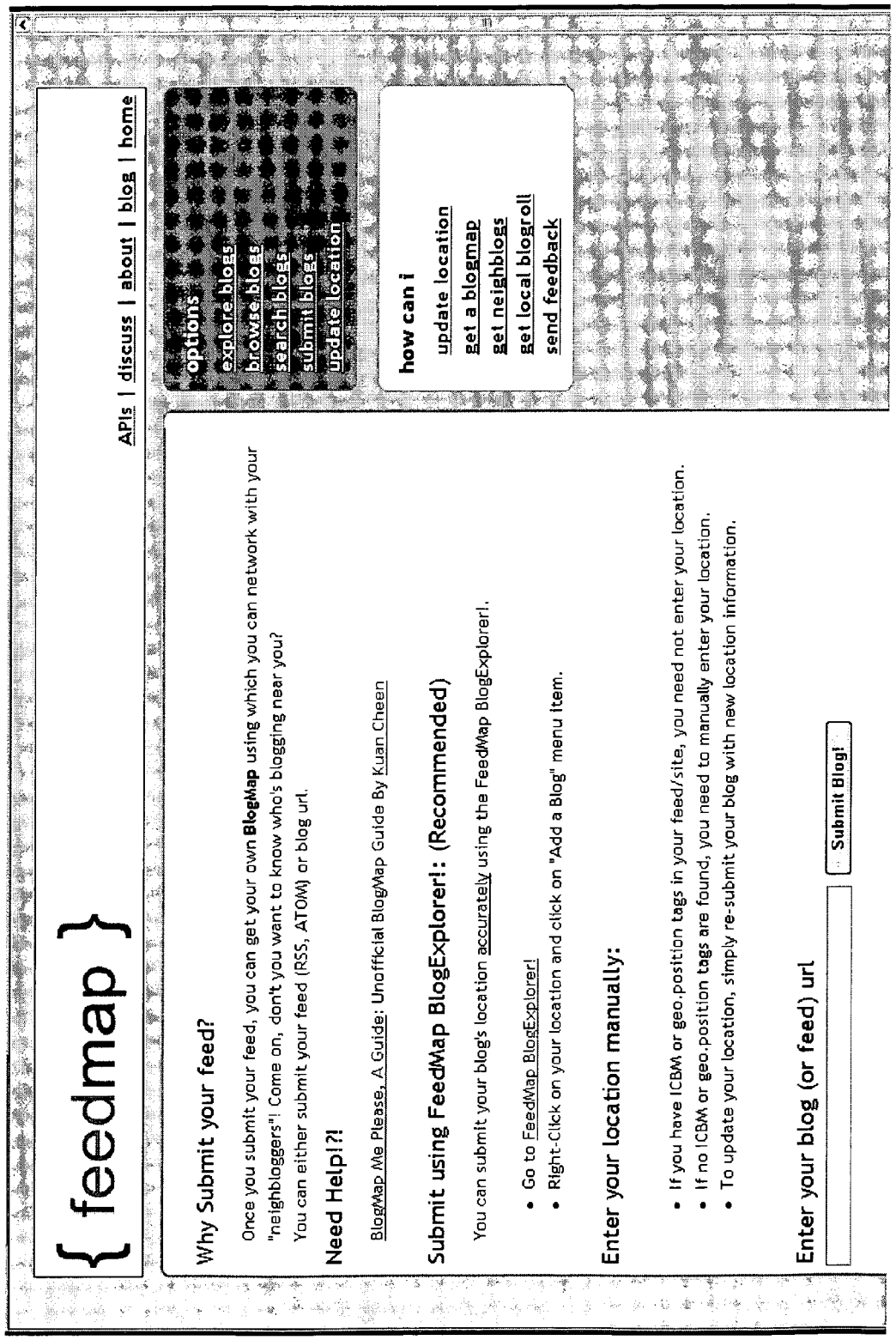
FIG. 12 is an exemplary user interface that provides information on how to submit blogs in this particular social network community.

FIG. 12 is an exemplary user interface that provides information on how to submit blogs in this particular social network community, and FIG. 13 is an exemplary user interface that provides API information in order to render a map view of the member's location for the benefit of other members on any site or page. That is, if a community member wishes to add the map as shown in FIG. 4 to his/her website or webpage, the API can be followed. Once completed, a map of the user's location can identify the user as a member of the particular community (e.g., blogging community). It should be appreciated that when added to a website or webpage, the map as shown in FIG. 4 can actually be scaled to a size that is large enough to read or comprehend but small enough so as to preserve the remaining display real estate for other content. For instance, the map may be rendered in the size of a badge or credit card.

Various methodologies will now be described via a series of acts. It is to be understood and appreciated that the subject system and/or methodology is not limited by the order of acts, as some acts may, in accordance with the subject application, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject application.

Figure 14:
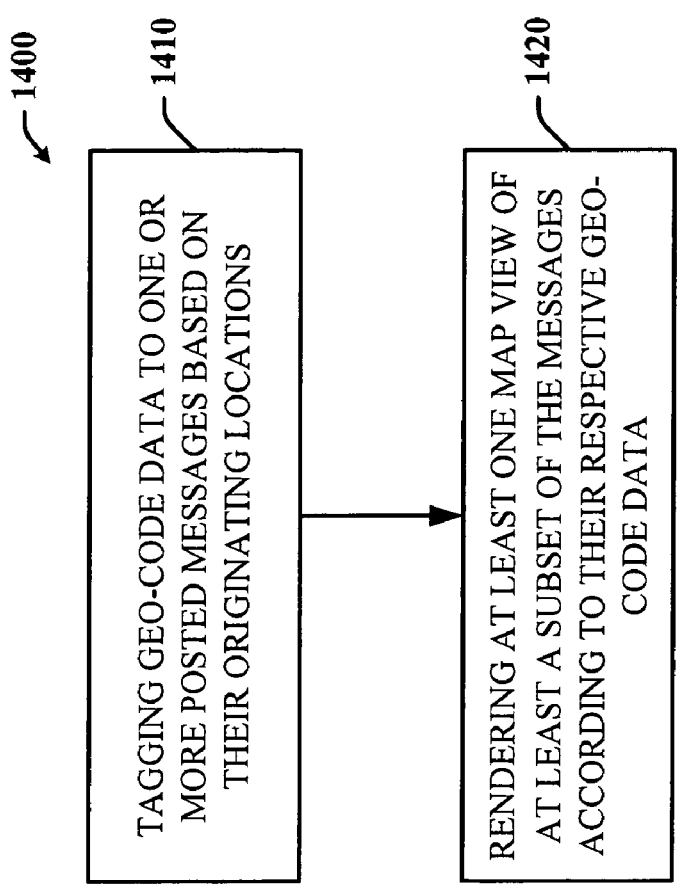
FIG. 14 is a flow diagram of a method that facilitates visualizing community members' locations to enhance communication within the social network community.

Turning now to FIG. 14, there is a flow diagram illustrating a method 1400 that facilitates visualizing community member locations to enhance communication within a social network community. The method 1400 involves tagging geo-code data to one or more posted messages based on their originating locations at 1410. For example, when a message is submitted for posting, it can be tagged with geo-code data that relates to its geographic location. So a message posted to the community from Oakland, California can be tagged with data corresponding to this city and state. Street information may also be included. The geo-code data can include coordinates based on any coordinate system. At 1420, at least one map view can be rendered to display at least a subset of the messages according to their respective geo-code data. Thus, when viewing a map of the Oakland area, any messages posted from this area can be presented on the map according to their geo-code data.

The city of Oakland can be selected as a focal point. From this particular focal point, postings can be viewed within a selected distance therefrom. For instance, a subject user can view postings and their respective locations which have been submitted from within 20 miles of the focal point, and then 100 miles, and then 200 miles. In addition, the focal point can be changed as desired by selecting a new focal point such as by clicking on an area on a map or by submitting a specific query location (e.g., Bellevue, Wash.). Thus, the method 1400 enhances communication among network members by displaying message postings according to their location and by allowing members to interact with one another based on member locations.

Figure 15:
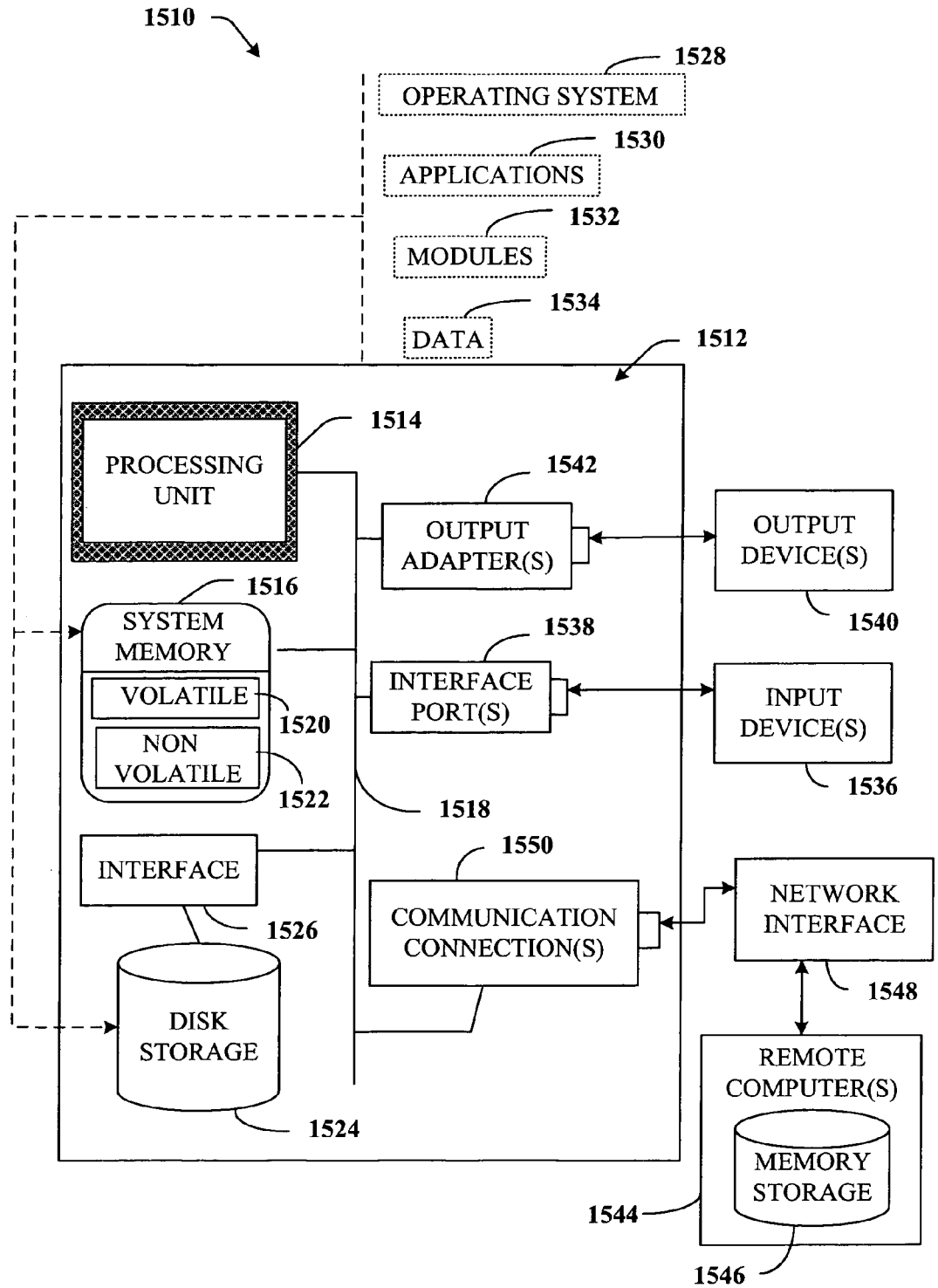
FIG. 15 illustrates an exemplary environment for implementing various aspects of the invention.

In order to provide additional context for various aspects of the subject mapping system and method, FIG. 15 and the following discussion are intended to provide a brief, general description of a suitable operating environment 1510 in which various aspects of the mapping system and method may be implemented. The subject system and method can operate on any computing device—portable or non-portable including but not limited to desktop computers, laptops, PDAs, smart phones, mobile phones, and tablet PCs on which the social network can be accessed and viewed. While the invention is described in the general context of computer-executable instructions, such as program modules, executed by one or more computers or other devices, those skilled in the art will recognize that the invention can also be implemented in combination with other program modules and/or as a combination of hardware and software.

Generally, however, program modules include routines, programs, objects, components, data structures, etc. that perform particular tasks or implement particular data types. The operating environment 1510 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 15, an exemplary environment 1510 for implementing various aspects of the invention includes a computer 1512. The computer 1512 includes a processing unit 1514, a system memory 1516, and a system bus 1518. The system bus 1518 couples system components including, but not limited to, the system memory 1516 to the processing unit 1514. The processing unit 1514 can be any of various available processors. Dual microprocessors and other multiprocessor architectures also can be employed as the processing unit 1514.

The system bus 1518 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MCA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1516 includes volatile memory 1520 and nonvolatile memory 1522. The basic input/output system (BIOS), containing the basic routines to transfer information between elements within the computer 1512, such as during start-up, is stored in nonvolatile memory 1522. By way of illustration, and not limitation, nonvolatile memory 1522 can include read only memory (ROM), programmable ROM (PROM), electrically programmable ROM (EPROM), electrically erasable ROM (EEPROM), or flash memory. Volatile memory 1520 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1512 also includes removable/nonremovable, volatile/nonvolatile computer storage media. FIG. 15 illustrates, for example a disk storage 1524. Disk storage 1524 includes, but is not limited to, devices like a magnetic disk drive, floppy disk drive, tape drive, Jaz drive, Zip drive, LS-100 drive, flash memory card, or memory stick. In addition, disk storage 1524 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1524 to the system bus 1518, a removable or non-removable interface is typically used such as interface 1526.

It is to be appreciated that FIG. 15 describes software that acts as an intermediary between users and the basic computer resources described in suitable operating environment 1510. Such software includes an operating system 1528. Operating system 1528, which can be stored on disk storage 1524, acts to control and allocate resources of the computer system 1512. System applications 1530 take advantage of the management of resources by operating system 1528 through program modules 1532 and program data 1534 stored either in system memory 1516 or on disk storage 1524. It is to be appreciated that the subject invention can be implemented with various operating systems or combinations of operating systems.

A user enters commands or information into the computer 1512 through input device(s) 1536. Input devices 1536 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1514 through the system bus 1518 via interface port(s) 1538. Interface port(s) 1538 include, for example, a serial port, a parallel port, a game port, and a universal serial bus (USB). Output device(s) 1540 use some of the same type of ports as input device(s) 1536. Thus, for example, a USB port may be used to provide input to computer 1512, and to output information from computer 1512 to an output device 1540. Output adapter 1542 is provided to illustrate that there are some output devices 1540 like monitors, speakers, and printers among other output devices 1540 that require special adapters. The output adapters 1542 include, by way of illustration and not limitation, video and sound cards that provide a means of connection between the output device 1540 and the system bus 1518. It should be noted that other devices and/or systems of devices provide both input and output capabilities such as remote computer(s) 1544.

Computer 1512 can operate in a networked environment using logical connections to one or more remote computers, such as remote computer(s) 1544. The remote computer(s) 1544 can be a personal computer, a server, a router, a network PC, a workstation, a microprocessor based appliance, a peer device or other common network node and the like, and typically includes many or all of the elements described relative to computer 1512. For purposes of brevity, only a memory storage device 1546 is illustrated with remote computer(s) 1544. Remote computer(s) 1544 is logically connected to computer 1512 through a network interface 1548 and then physically connected via communication connection 1550. Network interface 1548 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1550 refers to the hardware/software employed to connect the network interface 1548 to the bus 1518. While communication connection 1550 is shown for illustrative clarity inside computer 1512, it can also be external to computer 1512. The hardware/software necessary for connection to the network interface 1548 includes, for exemplary purposes only, internal and external technologies such as, modems including regular telephone grade modems, cable modems and DSL modems, ISDN adapters, and Ethernet cards.

What has been described above includes examples of the subject system and/or method. It is, of course, not possible to describe every conceivable combination of components or methodologies for purposes of describing the subject system and/or method, but one of ordinary skill in the art may recognize that many further combinations and permutations of the subject system and/or method are possible. Accordingly, the subject system and/or method are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. One or more computer storage media having computer-executable instructions embodied thereon that, when executed, perform a method for associating a geographic location with blog posts uploaded to an online-social-network community to enhance communication within the online-social-network community, the method comprising:
   determining, without user interaction at a current time, a current location of a first online-social-network community member uploading a first blog post to the online-social-network community;
   associating the current location of the first member with the first blog post by tagging geo-code data to the first blog post as the first blog post is uploaded to the online-social-network community, wherein the first blog post is not otherwise physically tied to the geographic location from which the first blog post is uploaded, wherein the current location associated with the first blog post is preset in the geo-code data for association with postings of the user regardless of the user's actual geographic location, and wherein the first blog post comprises a message that is accessible by at least one other member of the online-social-network community;
   storing in a social network database the first blog post and the associated geo-code data;
   rendering on a display device, at least one map view of a plurality of second blog posts uploaded by one or more second online-social-network community members, wherein the map view illustrates respective geographic locations associated with each of the plurality of second blog posts according to respective geo-code data tagged to each second blog post, wherein the map view is generated based on a focal point selected by the user, wherein the plurality of second blog posts is rendered on the map according to their respective distances from the focal point, and wherein the first blog post is included in the plurality of second blog posts and the first member is one of the one or more second members; and
   displaying information about the first or one of the plurality of second blog posts when a pointing device is hovered over an associated indicator on the map view representing the geographic location associated with the first or the one of the plurality of second blog posts, the information comprising at least a title of the respective blog post.

2. The computer storage media of claim 1, wherein the focal point corresponds to one of a location of a user viewing the map view or a location of a selected one of the plurality of second blog posts.

3. The computer storage media of claim 1, wherein the method further comprises:
   processing one or more search queries to find one or more of the plurality of second blog posts that are associated with a requested city, state, or country.

4. The computer storage media of claim 1, wherein the method further comprises:

facilitating navigation through at least a portion of the plurality of second blog posts according to their associated geographic locations.

5. The computer storage media of claim 4, wherein the method further facilitates discovery of a topic of interest to one or more social-network community members based on subject matter of the second posts to the social-network community.

6. The computer storage media of claim 1, wherein the method further comprises:
presenting at least a portion of the plurality of second blog posts that are within a given navigational distance of a selected blog post.

7. The computer storage media of claim 1, wherein the method further comprises:
analyzes analyzing at least one query to find one or more of the plurality of second blog posts associated with a desired geographic location, whereby available results are rendered in the at least one map view.

8. The computer storage media of claim 1, wherein the current location of the online-social-network community member uploading the first blog post is at least one of a location from which the first post is posted to the online-social-network community or a preset location associated with the member.

9. The computer storage media of claim 1, wherein the method further comprises facilitating viewing of illustrated locations-associated with each of the plurality of second posts on the at least one rendered map view.

10. A method for presenting a user interface that facilitates viewing blog posts uploaded to a social blogging community based on respective geographic locations from which the blog posts were posted, the method comprising:
generating an individualized map view based on a user-specified user geographic location configured for display on a display device coupled to a computing device, the individualized map view including a map customized to show the user-specified user geographic location as a focal point and having indicators representing blog posts uploaded by members of the social blogging community and respective geographic locations associated with each blog post, wherein the indicators on the map are selectable to display, on the map, at least a portion of the content of one blog post posted by a member of the social blogging community and the location associated with each blog post representing the location of the respective associated members at the time each member posted the blog post, wherein the blog posts are otherwise unidentifiable with a geographic location, and wherein the location of the respective associated member is capable of being preset by the respective associated member regardless of the member's actual location;
displaying information about a particular one of the blog posts when a pointing device is hovered over an associated indicator on the map representing the geographic location associated with the particular blog post, the information comprising at least a title of the particular blog post;
providing at least one status bar comprising a count of blog posts posted to the social blogging community by the members of the social blogging community that are associated with a geographic location within a set distance from the focal point on the individualized map view, the focal point being selected by the user;
providing a search field that accepts location-based search queries to facilitate searching for blog posts according to the associated geographic locations of the blog posts, the search field also accepting subject-matter-based search queries and content-based search queries for searching for blog posts according to their subject matter or the content of the blog posts; and
providing a set-up information display that comprises one or more set-up options, the one or more set-up options facilitating joining the social blogging community and interacting with one or more members thereof.

11. The method of claim 10, wherein the blog posts comprise at least one of message posts or event posts.

12. The method of claim 10, further comprising:
displaying, on the individualized map view, mapped indicators representing at least a subset of the blog posts that are associated with a geographic location that is within a set distance from the selected focal point.

13. The method of claim 10, wherein the information further comprises at least one of the following: author of the blog post, date of the blog post, or at least a subset of content from the blog post.

14. The method of claim 10, further comprising:
displaying, on the individualized map view, mapped indicators representing geographic locations associated with one or more blog posts that are within the set distance from the selected focal point.

15. The method of claim 14, wherein further comprising:
zooming in or out on the individualized map view for viewing of different levels of geographic location details and different numbers of blog posts.

16. A method that facilitates visualizing community member locations based on geographic locations associated with blog posts of the members to enhance communication within a blogging community, the method comprising:
employing a processor executing computer-executable instructions stored on a computer-readable storage medium to implement the following acts:
receiving a blog post from a blogging-community member, the blog post including an indication of an author of the blog post and a date of posting;
determining without user interaction at a time of posting, a current location of the blogging-community member upon receiving the blog post, wherein the current location of the online-social-network community member uploading the first post is at least one of a location from which the first post is posted to the online-social-network community or a location preset by input from the blogging-community member to associate with postings by the blogging-community member regardless of the blogging-community member's actual geographic location;
automatically associating the current location with the blog post by tagging geo-code data to the received blog post, the geo-code data comprising the determined current location of the blogging-community member who posted the blog post;
rendering at least one map view including a first marker located on the map view in accordance with the geo-code data and representing the received blog post, the first marker being displayed together with at least a second marker representing a disparate blog post and located on the map view according to geo-code data associated with the disparate blog post, and the first marker indicating one or more blogging communities to which the blogging-community member belongs, wherein the map view is generated based on a selected focal point with the second marker rendered on the map according to its distance from the focal point; and displaying on the map view upon hovering a pointing device over the first marker, information about the blogging-community member and at least one of a title of the blogging-community member's blog, a portion of the content of the blog post, the indication of the author, and the date of the posting.

* * * * *